Patented Sept. 25, 1951

2,568,736

UNITED STATES PATENT OFFICE 2,568,736

ALKYLATED POLYCYCLIC SULFONATES

Willard H. Kirkpatrick and Doyne L. Wilson, Sugar Land, Tex., assignors to Visco Products Company, Houston, Tex., a corporation of Delaware No Drawing. Application May 1, 1946, Serial No. 666,526

17 Claims. (Cl. 260—505)

This invention relates to the art of resolving petroleum emulsions, particularly of the water-in-oil type, encountered, for example, in the production, handling, and refining of petroleum. It also relates to certain surface active products suitable for use as petroleum emulsion breaking chemicals and wetting agents.

An object is to provide novel water wettable, interfacial and surface active products or chemicals adaptable for use as demulsifiers for water-in-oil emulsions, emulsifiers for oil-in-water emulsions, or for other uses where water wettable properties or characteristics are desirable, such as, for injections in oil wells to remove and prevent deposits of gypsum and calcareous deposits on sub-surface equipment, for use in conjunction with an alkaline neutralizing agent to neutralize and resolve acid-bearing crude oil emulsions, for use in the textile industry as wetting agents, dye aids, leveling agents, and other purposes, as additives in industrial circulating lubrication systems, as printing ink dispersants, for general detergent uses and for other purposes where surface active compositions are useful.

Further objects will appear from the following description in which the reagents and the processes for their employment relate to the treatment of petroleum emulsions.

In accordance with this invention it has been found that new and improved compositions of matter having wetting and petroleum emulsion breaking properties can be obtained from the polymers resulting from the catalytic polymerization with a solid, adsorbent polymerizing catalyst of a vaporizable petroleum hydrocarbon containing polymerizable diolefine unsaturated components. To be suitable for the practice of this invention the polymers used must be capable of further polymerization with a sulfonating polymerizing catalyst. For the purpose of the present invention, moreover, it is desirable that the further polymerization be carried out in the presence of a modifying substance which can introduce a group or groups into the resultant molecule that will reduce hydrophobe characteristics and/or will confer hydrophile characteristics on the resulting product. The products obtained may be further modified by neutralization with amines and/or alkalies (e. g. ammonia, sodium hydroxide, or potassium hydroxide) in amounts sufficient to neutralize the residual acidity, or they may be reacted with amines at higher temperatures with a further modification in the characteristics of the product.

The preferred type of raw material for the purpose of this invention is a polymeric residue derived from treating a petroleum hydrocarbon having unsaturated components whereby the vapors of the hydrocarbon are subjected to the catalyst action of a solid adsorbent polymerizing catalyst (e. g. an adsorbent earth) under varying conditions of pressure and temperature. Residues of this type are obtained as a by-product of the treatment of hydrocarbons, such as gasoline, by a process originally known as the Gray process, and originally disclosed in the U. S. Letters Patent No. 1,340,889. Various modifications of this process are also described in Gray U. S. 1,759,812, 1,759,813 and 1,759,814, Dickinson U. S. 1,853,671, Gray U. S. 1,853,972, Connolly U. S. 1,934,967 and 1,934,968, Nisson U. S. 1,948,126, Gray U. S. 1,952,855, and Gray 2,034,575. Among others describing polymers suitable for use in this process is Houdry U. S. Patent 1,837,963, and subsequent Houdry patents covering modifications and variations of the process disclosed therein.

The hydrocarbons used initially in processes such as the Gray and Houdry processes, are petroleum hydrocarbons, for example, cracked gasoline, containing unsaturated gum-forming and other components. The removal of these gum-forming components produces the polymeric by-product residues employed as starting materials in accordance with this invention.

The Gray process as originally disclosed in U. S. Patent 1,340,889, dated May 25, 1920, described a treatment of the hydrocarbon vapors with a solid adsorptive catalyst, such as fuller's earth. By this processing diolefines and other polymerizable substances are partially polymerized to viscous oils or resinous solids while monoolefines are practically unaffected.

The chemical nature of these polymerizable components has been indicated by various observers as involving cyclic unsaturated compounds (such as the fulvenes) together with aliphatic and cyclic diolefines and alkenyl aromatics. Since the residues which we desire to use vary with charge stock, rate of throughput, cracking conditions and condition of catalyst, the characteristics, extent of polymerization, and chemical components of the residue products which have been found suitable for this purpose may vary within substantial limits.

The analysis of one such Gray tower residue revealed the presence of cyclopentadiene 6% to 8%, isoprene 10% to 12%, piperylene 3% to 7%, etc. The specification of another polymerizable unsaturated residue from a Gray tower which we have found to be suited to our purpose was as follows: polymerizable unsaturates 70%, specific gravity 0.90, refractive index at 25 degrees C. 1.5028, initial boiling point 63 degrees C. (145° F.) with 40% over at 237 degrees C. (429° F.) at 760 mm. pressure. A preferred type of polymer is hereafter described in conjunction with the examples.

In both the Houdry and Gray processes the temperatures used are sufficiently high to at least partially polymerize the unsaturated diolefinic components of the petroleum hydrocarbons treated but below the temperatures at which substantial cracking normally occurs.

The diolefinic resins of commerce are unsuited for use as wetting agents and for breaking petroleum emulsions due to their extreme hydrophobic character. However, in the practice of the present invention a product is obtained in which the hydrophobe-hydrophile characteristics are balanced as desired for optimum performance in resolving petroleum emulsions and many other uses.

In the practice of the present invention we prefer to polymerize the polymerizable components of the initial polymer with a suitable sulfonating polymerizing agent or catalyst (e. g. sulfuric acid, chlorosulphonic acid or sulfur trioxide) in the presence of and/or with the subsequent addition of a modifying substance which can introduce a group or groups into the resinoid molecule that will reduce the hydrophobe characteristics of the polymer and/or confer hydrophile characteristics on the resulting product. We have found the following modifying agents to be suitable for this purpose: monohydric aliphatic alcohols, for example, isopropyl alcohol, amyl alcohol, octyl alcohol, oleyl alcohol, etc.; the corresponding monolefines to accomplish alkylation; polyhydric aliphatic alcohols, for example, ethylene glycol, polyethylene glycols, glycerine and its simple derivatives; organic amines having a replaceable hydrogen atom, for example, aliphatic primary and secondary monoamines, e. g., methylamine, ethylamine, propylamine, butylamine, amylamine, octylamine, dimethylamine, cyclohexylamine, dicyclohexylamine, and homologues thereof; aralkylamines, e. g., benzylamine, dibenzylamine; alkylolamines, e. g., monoethanolamine, diethanolamine, monopropanolamine, dipropanolamine, and higher homologues; polyamines, for example, ethylene diamine, diethylene triamine, triethylene tetramine, tetraethylene pentamine, metaphenylene diamine, o-phenylene diamine, benzidine, p-phenylene diamine, 2,4-diamino diphenylamine, 4,4'-diaminodiphenyl ether, and homologues thereof; aromatic amines, e. g., aniline o, m, or p toluidines, xylidines, o, m, or p ansidines, o, m, or p phenetidines, alpha or beta naphthylamine, and homologues thereof, alkylolamines polymerized with the removal of chemically available water, alkylolamines polymerized in the presence of an acidic condensation catalyst (e. g. zinc chloride) with or without substantial removal of water, for instance, polymerized triethanolamine or mixtures thereof with diethanolamine, and homologues; aromatic sulfonic acids, e. g., naphthalene sulfonic acid; sulfonated diphenyl, sulfonated anthracene and other polynuclear sulfonates; nuclear substituted derivatives of aromatic sulfonic acids, e. g. diamylisopropylnaphthalene sulfonic acid and other alkylated sulfonated polynuclear aromatic hydrocarbons; sulfo-fatty acids, e. g., sulfo-ricinoleic acid; Twitchell type sulfo-acids, e. g., benzenestearosulfonic-acid, naphthaleneoleosulfonic-acid; copolymeric resinophore bodies, e. g., styrene, Diels-Alder adduct (addition of maleic anhydride (1.4) to a conjugated system) etc.; and additive reactions under controlled conditions, such as, oxidation with air, reaction with epoxy compounds (e. g., ethylene oxide) halogenation with or without hydrolysis, and other reactions capable of conferring water wettability or hydrophile characteristics on the resultant product.

Depending upon the choice of modifying agents, the resulting product at this stage may be either water dispersible or water wettable. In certain instances it may be desired to extend the polymerization to a greater degree which can be readily accomplished by continuing the treatment at an elevated temperature with the consequent production of a more complex condensation product. The resulting product, either as such, or in the form of its salt or amine condensation product, is suitable as an emulsion breaker and wetting agent.

From the standpoint of convenience in handling and using the finished products, it is to be desired that the residual acidity of the product be neutralized with some suitable alkaline material, such as ammonia, lime, caustics, and organic bases, such as amines and hydroxyamino bodies. The solubility characteristics of the products may be further modified by the proper selection of the substance used to neutralize the residual acidity. Amines such as dicyclohexylamine and cyclohexylamine confer water insolubility and oil solubility to the finished product, resulting in maximum hydrophobic characteristics. On the other hand, amines such as ethylamine, isopropylamine, monoethanolamine, etc., confer water solubility and oil insolubility to the finished product, resulting in maximum hydrophilic characteristics. Likewise, other amines, such as, butylamine, diethanolamine, confer intermediary solubilities resulting in characteristics between the hydrophobe and hydrophile extremes. Inorganic alkaline neutralizing agents usually confer predominantly hydrophilic characteristics on the resultant products.

In some instances it is desirable to extend the polymerization by heating at elevated temperatures after neutralization has been effected. Under these circumstances it is possible for amidification to occur and such reaction is within the scope of this invention.

We are setting forth below for the purposes of specific illustration examples of preparing specific products which have been found to be especially suitable for the purposes intended. It is to be understood that these examples are exemplary of our invention and that we are not limited to such examples. The quantities are stated in parts by weight unless otherwise indicated.

EXAMPLE I

To 524 parts of diamylnaphthalene and 60 parts of isopropyl alcohol there was added 1000 parts of 98% sulfuric acid maintaining the temperature below 45 degrees C. during addition of the acid. The temperature was then raised to 55 degrees C. and maintained two hours. This constituted the intermediate modifying agent for the polymerization of the Gray tower residue and was prepared separately as a matter of convenience.

To this intermediate mass was added 240 parts of a Gray tower residue. The mixture was stirred thirty minutes at 70 degrees C., then 880 parts of water was added with stirring to effect stratification and subsequent removal of the excess sulfuric acid.

The aqueous sulfuric acid was drained off to waste and the remaining reddish-brown modified resin was then further condensed by stirring two hours at 115 degrees C.

EXAMPLE II

To 550 parts of the modified resin, as prepared in Example I prior to neutralization, there was added 105 parts of commercial ammonium hydroxide which was sufficient to render the acid mass neutral to methyl orange. The temperature was then raised to effect loss of 50 parts of aqueous distillate. This was obtained by using a temperature range 99 degrees C. to 106 degrees C. over a period of one hour. The contents were stirred until cool. The product was predominantly water soluble.

EXAMPLE III

To 550 parts of the modified resin of Example I there was added an amount of diethylene triamine which was insufficient to neutralize the acid mass. The partially neutralized material was then heated with stirring to effect loss of an aqueous distillate and to extend the degree of polymerization. The mass was allowed to cool to approximately 60 degrees C. and the residual acidity neutralized with commercial ammonium hydroxide. The product had both oil and water solubility characteristics.

EXAMPLE IV

Approximately 3500 pounds of pentalene #95 (a mixture of monamyl and diamylnaphthalene) and 350 pounds of 99% isopropanol were mixed and sulfonated with 4800 pounds of 98% sulphuric acid. The acid was added intermittently in such a manner that the temperature of the mass was not permitted to exceed 45° C. Sulfonation was continued at a temperature of 60° C. maintaining the mass at this point for two hours. The free acid was then washed out by dropping the reaction product into cold water containing 300 gallons of gas oil while cooling below 80° C. The amount of cold water used was such that the final wash water at room temperature could not be less than 38° Bé. nor more than 41° Bé. The gas oil used was a petroleum hydrocarbon fraction with a boiling point somewhat higher than that of kerosene and was added in the washing process to permit a more ready stratification of the two layers. When the stratification was substantially complete, the acid aqueous layer was removed by bleeding off from the bottom of the process kettle. To the upper organic layer was added 425 pounds of monobutylamine and the temperature brought up to 110° C.

At this point 1153 pounds of a polymerizable Gray tower polymer was added and the temperature raised to 115 degrees C. where it was maintained for two hours.

After this elapse of time, the source of heat was removed from the material and the temperature was allowed to fall to a suitable point for the addition of water, whereupon 110 to 150 gallons of water were added and thoroughly stirred. The acid water was allowed to settle out and the residual acidity of the mass was neutralized to methyl orange alkalinity with 26° Bé. ammonia. The ammonium sulphate solution was allowed to settle out and if necessary, the product can be brightened by heating to remove any water present in suspension. This yielded the finished product.

Fourteen and three-tenths (14.3) quarts of the composition prepared as above described were employed in treating 1436 barrels of a water-in-oil emulsion. Excellent results were obtained in breaking the emulsion.

EXAMPLE V

The process was carried out as described in Example IV except that after the addition of the Gray tower polymer to the partially neutralized sulfonated mass the processing temperature was 130 degrees C. rather than 115 degrees C. The remainder of the processing conditions were identical. This product is substantially oil soluble and also has substantial water solubility.

EXAMPLE VI

Approximately 3500 pounds of pentalene No. 95 and 350 pounds of 99% isopropanol were sulfonated with 4800 pounds of 98% sulfuric acid as described in Example IV. The acid mass was washed by running it into cold water containing 150 gallons of gas oil and 100 gallons of Gray tower polymer. After stratification was complete, the acid layer was withdrawn and the organic layer was heated for two hours at a temperature between 110 degrees C. and 115 degrees C. The mass was then neutralized to methyl orange alkalinity with approximately 1000 pounds of 26 degree Baumé ammonia. The neutralized product was allowed to settle and any separated ammonium sulfate was removed to yield a finished product. This product has substantial oil solubility but is predominantly water soluble. It is useful for breaking certain types of petroleum emulsions, is also useful as a detergent and can be employed in descaling oil well systems and in other types of descaling operations. When employed for descaling oil well subsurface equipment it is preferably added to water and injected into the well.

In the foregoing examples the Gray tower polymer employed was produced from cracked petroleum hydrocarbons obtained from the Texas coastal region, specifically, Corpus Christi, West Columbia, Hastings and High Island. The crude petroleums from this region varies from 70% naphthenic to 100% paraffinic.

*Physical characteristics of Gray tower polymer obtained*

| | |
|---|---|
| Gravity | °A. P. I.__ 27.5 |
| Bromine No. | 9.26 |
| Iodine No. | 9.48 |
| Aromatic compounds | per cent__ 28 |

*Distillation*

| | |
|---|---|
| Initial boiling point | 382 |
| 5% | 391 |
| 10% | 394 |
| 20% | 398 |
| 30% | 404 |
| 40% | 409 |
| 50% | 416 |
| 60% | 426 |
| 70% | 448 |
| 80% | 504 |
| 90% | 624 |
| End point | 688 |
| Recovered | 97.0 |
| Residue | 3.0 tar |

It will be understood that the foregoing Gray tower polymer represents a typical example and that the invention is not limited to the use of polymerizable substances having the specific physical characteristics described. It is important for the purpose of the invention, however, that the polymer employed as a starting material be one which is derived by the polymerization of petroleum hydrocarbons containing diolefine components.

The polymers formed in the Gray process are liquid but upon exposure to air they gradually harden to a solid gum. The specific gravity is usually about 0.800 to 0.900 and the boiling range from about 185 degrees F. to 700 degrees F. The present invention contemplates the use of polymers within this boiling range or fractions thereof, but the higher boiling fractions, e. g., fractions boiling within the range from 382 degrees F. to 688 degrees F. are preferred.

The initial sulfonation is preferably effected at a temperature below 45 degrees C. with a final temperature around 60 degrees C., and in any case lower than the temperature at which decomposition begins to occur with the evolution of substantial amounts of sulfur dioxide.

The time required for the sulfonation with the concentrated sulfuric acid is preferably about two hours, but may vary from about 60 minutes to about 180 minutes. The product becomes more viscous as the sulfonating time is increased.

In the polymerization in the presence of sulfuric acid as the sulfonating polymerizing catalyst the concentration of sulfuric acid is preferably within the range of 20° Bé. to 60° Bé. In general, the sulfonating conditions are such as to avoid the formation of insoluble, infusible resins. Relatively low temperatures are employed for the same reason. The pressures used may be atmospheric, subatmospheric or superatmospheric.

As illustrated by the examples, condensation reactions between the sulfonated polymerized diolefin-containing petroleum hydrocarbons and auxiliary modifying agents capable of reducing the hydrophobe characteristics of the product can take place at higher temperatures than the initial sulfonation-polymerization. The preferred temperatures for this purpose are within the range of 80° C. to 150° C. and the preferred operating pressure is atmospheric pressure. Higher temperatures and pressures can be used but the pressures and temperatures should be substantially below those which cause the formation of substantial amounts of decomposition products and the formation of insoluble infusible resins.

The products produced in accordance with the examples may be described as water wettable sulfonic acids of polymerized petroleum polymers resulting from the catalytic polymerization with a solid adsorbent polymerizing catalyst of a vaporizable petroleum hydrocarbon containing polymerizable diolefine components, and the salts, esters and amine condensation products of said sulfonic acids. When the preparation of the products involves an additional reaction with a modifying agent capable of reducing the hydrophobe characteristics of the products they may be described as being characterized by the presence in the molecule of a modifying group derived from a modifying agent capable of preventing the formation of a resin which is water repellent. When the modifying agent employed is an alkylating agent the products may be characterized as "alkylated." When the preparation of the products involves a reaction with an alkylated polycyclic aromatic hydrocarbon the products may be described as water wettable alkylated polycyclic aromatic sulfonic acids of polymerized petroleum polymers resulting from the catalytic polymerization with a solid adsorbent polymerizing catalyst of a vaporizable petroleum hydrocarbon containing polymerizable diolefine components, and the salts, esters and amine condensation products of said sulfonic acids.

The expression "water-wettable" is used herein to define products in which the hydrophobic properties have been reduced sufficiently and the hydrophilic properties have been increased sufficiently to form wettable films at the interface of a petroleum emulsion. These products are therefore suitable for breaking petroleum emulsions, especially emulsions of the water-in-oil type. The ordinary polymers and resins derived from diolefines found in petroleum hydrocarbons are water repellent.

The expression "amine condensation product" is employed herein to cover generically the amine salts and the condensation products obtained by heating these salts at higher temperatures. The latter reaction might be described as acylation and the products as amides.

The expression "predominantly water soluble" is used herein to describe products that disperse in water in effective amounts to give clear solutions and have better water solubility than oil solubility. The expression "predominantly oil soluble" is used herein to describe products that disperse in oil in effective amounts to give clear solutions and have better oil solubility than water solubility. Intermediate between these types of products are others that have substantial oil and water solubility but do not necessarily form clear solutions. The manner in which these various types of products can be formed has been previously explained. The oil soluble, water insoluble amines when employed in the "amine condensation" increase the oil solubility of the product. Neutralization with an inorganic cation ($NH_4$, Na, K, etc.) increases water solubility. Partial amine neutralization or condensation and partial neutralization with an inorganic cation give varying oil and water solubility characteristics.

The utility of the products of the invention for a given purpose will vary depending upon their properties. Also in breaking petroleum emulsions the efficiency of the products will vary depending upon the particular emulsion. The quantity of the product required for breaking a given petroleum emulsion may also vary, and is normally greater for the exceedingly stable types of petroleum emulsions. In general, the amounts required are within the range of one part of the active ingredient to 2000 to 100,000 parts of petroleum emulsion. Thus, with the product described in Example IV, good results were obtained with a ratio of one part of this product to 16,800 parts of a water-in-oil emulsion.

The oil soluble products can be employed in the preparation of rinses for removing liquid hydrophilic contaminants from solid surfaces. This may be accomplished, for example, by dissolving an oil soluble amine salt of one of the aforesaid products in a non-aqueous hydrophobic organic solvent such as benzine, toluene, unleaded gasoline, kerosene, naphtha, gas oil, fuel oil, diesel oil, bunker oil, carbon tetrachloride, or other non-aqueous hydrophobic organic solvents and then rinsing the surfaces containing the traces of water or other hydrophilic contaminant with the resultant non-aqueous rinsing solution. Compositions of this kind may be described as reversed detergents because they replace a water film with a film of a hydrophobic substance. When a rinse of this type is poured off the surface is left in a condition such that any hydrophobic material subsequently placed in contact with it will readily wet it and there will not even be a trace of water present at the contact surface. In this way oil drums used to carry lubricating and fuel oils can readily be cleaned. Likewise, metallic parts which are often reduced to precisely finished shapes by machine tools while the temperature is kept down by a water-containing coolant can readily be cleaned and the water removed so as to prevent subsequent rusting. This type of treatment to remove hydrophilic contaminants is effective on many different types of material, including metal, glass and plastics (e. g., Lucite).

The predominantly water soluble products of the invention are especially useful as detergents, particularly good results being obtained with products of the type described in Example VI. These predominantly water soluble compositions are also especially suitable for descaling. The oil soluble products are operable for this purpose but the predominantly water soluble products are far superior. The control of scale formation in tubing and flow lines have become a problem in many oil fields. In order to remove scale a small amount of one of the predominantly water soluble products herein described (for example, one gallon per 100 barrels of oil production) may be used as such or may be dissolved in a suitable amount of water and added to the flow line or to the oil in the well (i. e., a down-the-hole treatment). This addition serves to disperse paraffin which gradually accumulates in minute particles, and also removes and prevents the formation of scale. Some of the materials now being employed for this purpose will prevent scale formation but are not effective in removing the paraffin.

Due to their wetting and surface active properties the products of the invention are also useful for other uses where water wettable properties or characteristics are desirable. In addition to the uses previously enumerated they can be employed in the textile industry as wetting agents, anti-static agents, dye aids, levelling agents, and for other similar purposes. They can also be employed as printing ink dispersants and for general detergent uses, such as removing oil and grease from garage floors, barge floors, ferry floors, dairy buildings, machine shops and the like. Additionally, they may be used as additives in industrial and circulating lubrication systems where a lubricating oil is subject to contamination with water, as, for instance, in the lubrication of gear trains, rollers, bearings and other equipment normally subject to friction and wear and which is also subject to contamination by water in paper mills, steel mills and other industrial usages. When thus used as additives, these compositions cause a separation of the water and increase the lubricating efficiency which otherwise would be adversely affected or destroyed due to the action of the water in emulsifying the oil. In a similar manner these compositions are useful as additives for hydrophobic hydraulic fluids. They can also be added to aqueous coolants used in industrial operations.

The products of the invention also exhibit definite germicidal properties.

So much of this invention as relates to processes for breaking petroleum emulsions is covered in a divisional application, Serial No. 725,714, filed January 31, 1947.

Having thus described the invention, what we claim as new and desire to secure by Letters Patent of the United States is:

1. Compositions from the group consisting of water wettable condensation products of an alkylated polycyclic aromatic sulfonic acid and a vaporizable petroleum hydrocarbon polymer boiling within a range of 145° F. to 700° F. derived by subjecting petroleum hydrocarbon vapors containing polymerizable diolefine components to the catalytic action of a solid adsorptive polymerization catalyst, and the salts, esters, and amine condensation products thereof.

2. Compositions from the group consisting of water wettable condensation products of an alkylated polycyclic aromatic sulfonic acid and a vaporizable petroleum hydrocarbon polymer boiling within a range of 145° F. to 700° F. containing polymerizable diolefine components derived by subjecting petroleum hydrocarbon vapors containing unsaturated components to the catalytic action of a solid adsorptive polymerization catalyst, and the salts, esters, and amine condensation products thereof, formed at a temperature within the range from 80 degrees C. to 150 degrees C.

3. A water wettable condensation product of an alkylated polycyclic aromatic sulfonic acid and a Gray tower polymer formed at a temperature within the range from 80 degrees C. to 150 degrees C. and neutralized.

4. A water wettable condensation product of a partially neutralized alkylated naphthalene sulfonic acid and a Gray tower polymer formed at a temperature within the range of 80 degrees C. to 150 degrees C. and neutralized.

5. The product of the reaction of a partially neutralized alkylated and sulfonated naphthalene and a Gray tower polymer heated at a temperature in the range from 115 degrees C. to 130 degrees C. for about two hours and neutralized.

6. The product obtained by reacting an amyl naphthalene, isopropyl alcohol and concentrated sulfuric acid at a temperature not exceeding 60 degrees C. for a period of time within the range from about 60 minutes to about 180 minutes, separating the excess sulfuric acid, partially neutralizing the resultant product with an amine, adding a polymerizable Gray tower polymer, heating the resultant product to a temperature within the range of 80 degrees C. to 150 degrees C., substantially completing the neutralization of the product with ammonia, and removing water soluble salts.

7. The product obtained by reacting an amyl naphthalene, isopropyl alcohol and concentrated sulfuric acid at a temperature not exceeding 60 degrees C. for a period of time within the range from about 60 minutes to about 180 minutes, separating the excess sulfuric acid, partially neutralizing the resultant product with a primary aliphatic amine, adding a polymerizable Gray tower polymer, heating the resultant product to a temperature within the range of 80 degrees C. to 150 degrees C., substantially completing the neutralization of the product with ammonia, and removing water soluble salts.

8. The product obtained by reacting an amyl naphthalene, isopropyl alcohol and an excess of concentrated sulphuric acid at a temperature not exceeding 60 degrees C. for a period of time from about 60 minutes to about 180 minutes, adding a Gray tower polymer, removing the excess sulfuric acid, adding a quantity of an amine sufficient to partially neutralize the reaction product, heating the resultant product to cause loss of an aqueous distillate, cooling and neutralizing with aqueous ammonia.

9. The product obtained by reacting an amyl naphthalene, isopropyl alcohol and an excess of concentrated sulfuric acid at a temperature not exceeding 60 degrees C. for a period of time from about 60 minutes to about 180 minutes, adding a Gray tower polymer, removing the excess sulfuric acid, adding a quantity of an aliphatic amine containing primary amino groups sufficient to partially neutralize the reaction product, heating the resultant product to cause loss of an aqueous distillate, cooling and neutralizing with aqueous ammonia.

10. The product obtained by reacting about 3500 parts by weight of an amyl naphthalene, 350 parts by weight of 99% isopropyl alcohol and 4800 parts by weight of concentrated sulfuric acid at a temperature not exceeding 45 degrees C. during the addition of the acid and not exceeding 60 degrees C. thereafter for a period of time within the range from about 60 minutes to about 180 minutes, separating the excess free sulfuric acid, partially neutralizing the resultant product with 425 parts by weight of monobutylamine, adding 1153 parts by weight of a polymerizable Gray tower polymer, heating the resultant product to a temperature within the range of 115 degrees C. to 130 degrees C. for about two hours, substantially completing the neutralization of the product with ammonia, and washing with water to remove soluble salts.

11. The product obtained by reacting an amyl naphthalene, isopropyl alcohol and an excess of concentrated sulfuric acid at a temperature not exceeding 60 degrees C. for a period of time from about 60 minutes to about 180 minutes, adding a Gray tower polymer, removing the excess sulfuric acid, heating the resultant product at a temperature within the range of 80 degrees C. to 150 degrees C., and neutralizing the resultant product wtih ammonia.

12. The product obtained by reacting an amyl naphthalene, isopropyl alcohol and an excess of concentrated sulfuric acid at a temperature not exceeding 60 degrees C. for a period of time from about 60 minutes to about 180 minutes, adding a Gray tower polymer, removing the excess sulfuric acid, heating the resultant product at a temperature within the range of 80 degrees C. to 150 degrees C., and neutralizing the resultant product with dicyclohexylamine.

13. The product obtained by reacting an amyl naphthalene, isopropyl alcohol and an excess of concentrated sulfuric acid at a temperature not exceeding 60 degrees C. for a period of time from about 60 minutes to about 180 minutes, adding a Gray tower polymer, thereafter removing the free sulfuric acid and heating the resultant product to a temperature within the range of 80 degrees C. to 150 degrees C.

14. The product obtained by reacting 520 parts by weight of an amyl naphthalene, 60 parts by weight of isopropyl alcohol and 1000 parts by weight of 98% concentrated sulfuric acid at a temperature not exceeding 45 degrees C. during the addition of the acid and not exceeding about 60 degrees C. thereafter for a period of time within the range from about 60 minutes to about 180 minutes, adding 240 parts by weight of a polymerizable Gray tower polymer, separating the excess sulfuric acid, and heating the resultant product at a temperature of 115 degrees C. for two hours.

15. The products from the group consisting of: (1) the products obtained by heating polymerizable petroleum diolefine polymers boiling within the range of 145° F. to 700° F. at 80° C. to 150° C. within a sufficient amount of an alkylated polycyclic sulfonic acid to render such polymers water wettable, and the salts, esters and amine condensation products thereof; and (2) the products obtained by heating polymerizable petroleum dioefine polymers boiling within the range of 145° F. to 700° F. at 80° C. to 150° C. with an alkylated polycyclic sulfonic acid partially neutralized with an amine and then finally neutralizing the resultant product.

16. The products from the group consisting of (1) the products obtained by heating Gray tower polymers at 80° C to 150° C. with a sufficient amount of an alkylated polycyclic sulfonic acid to render such polymers water wettable, and the salts, esters and amine condensation products thereof; and (2) the products obtained by heating Gray tower polymers at 80° C. to 150° C. with an alkylated polycyclic sulfonic acid partially neutralized with an amine and thereafter finally neutralizing the resultant product.

17. The products from the group consisting of: (1) the products obtained by heating Gray tower polymers at 80° C. to 150° C. with a sufficient amount of an amyl napthalene sulfonic acid to render such polymers water wettable, and the salts, esters and amine condensation products thereof; and (2) the products obtained by heating Gray tower polymers at 80° C. to 150° C. with an amyl napthalene sulfonic acid partially neutralized with an amine and then finally neutralizing the resultant product.

WILLARD H. KIRKPATRICK.
DOYNE L. WILSON.

REFERENCES CITED

The following references are of record in the file of this patent:

UNITED STATES PATENTS

| Number | Name | Date |
|---|---|---|
| 1,999,128 | MacLaren | Apr. 23, 1935 |
| 2,036,469 | Field | Apr. 7, 1936 |
| 2,050,639 | Wayne | Aug. 11, 1936 |
| 2,061,601 | Steik | Nov. 24, 1936 |
| 2,126,839 | Suthard | Aug. 16, 1938 |
| 2,149,661 | Brandt | Mar. 7, 1939 |
| 2,231,753 | DeGroote | Feb. 11, 1941 |
| 2,340,654 | Flett | Feb. 1, 1944 |
| 2,353,700 | DeGroote et al. | July 18, 1944 |
| 2,397,191 | Meyer | Mar. 26, 1946 |
| 2,433,316 | Carnes | Dec. 23, 1947 |
| 2,450,585 | D'Ouville et al. | Oct. 5, 1948 |